United States Patent [19]
Johnson et al.

[11] 3,929,599

[45] Dec. 30, 1975

[54] PROCESS FOR REMOVING IRON FROM AN AQUEOUS ACID SOLUTION CONTAINING IRON AND COPPER

[75] Inventors: Morris A. Johnson; Kang Yang, both of Ponca City, Okla.

[73] Assignee: Continental Oil Company, Ponca City, Okla.

[22] Filed: Jan. 9, 1975

[21] Appl. No.: 539,757

[52] U.S. Cl. .................... 204/108; 75/108; 75/117
[51] Int. Cl.² ...................... C25C 1/12; C25B 15/12
[58] Field of Search ............... 75/117, 108; 204/108

[56] References Cited
UNITED STATES PATENTS

| | | | |
|---|---|---|---|
| 3,109,732 | 11/1963 | Goren | 75/101 R |
| 3,476,554 | 11/1969 | Spedden et al. | 204/108 X |
| 3,586,498 | 6/1971 | Kasey | 75/101 R |
| 3,669,651 | 6/1972 | Spedden et al. | 75/117 X |
| 3,730,860 | 5/1973 | Horton et al. | 204/108 |

*Primary Examiner*—G. Ozaki
*Attorney, Agent, or Firm*—F. Lindsey Scott

[57] ABSTRACT

The present invention relates to an improved process for removing iron ions from an aqueous acid solution without removing copper ions contained therein comprising the steps of combining activated carbon with the aqueous acid solution in an amount of at least about 0.01% by weight of said solution, adjusting the pH of the solution to a value in the range of from about 2.0 to about 2.5 so that iron ions contained in the solution are hydrolyzed and precipitated but copper ions contained therein remain in the solution and then separating the precipitate from the solution.

9 Claims, No Drawings

PROCESS FOR REMOVING IRON FROM AN AQUEOUS ACID SOLUTION CONTAINING IRON AND COPPER

BACKGROUND OF THE INVENTION

1. Field of the Invention

The present invention relates generally to an improved process for removing iron from an aqueous acid solution containing iron and copper, and more particularly, but not by way of limitation, to a process for removing iron from an aqueous sulfuric acid leach solution containing copper ions without removing the copper ions from the solution so that the copper ions can be subsequently efficiently recovered in an electrowinning process.

2. Description of the Prior Art

Copper hydrometallurgy has heretofore been utilized, particularly in recent years, for the recovery of copper values from low grade ores. Hydrometallurgy methods of recovering copper from ores generally avoid air pollution problems associated with heretofore used ore roasting processes, i.e., the discharge of sulfur dioxide into the atmosphere. While processes have been developed for recovering sulfur dioxide from the effluent gases produced in the ore roasting, such processes generally require elaborate apparatus to carry out.

Heretofore, copper hydrometallurgy processes have included the steps of contacting ore containing copper with an aqueous sulfuric acid leach solution so that copper contained in the ore is dissolved by the acid. Other metals contained in the ore are also dissolved, particularly, iron which is removed from the acid leach solution by precipitation as iron hydroxide. Generally, the iron precipitation is brought about by the addition of calcium carbonate to the acid leach solution. That is, calcium carbonate is added to the acid leach solution to adjust the pH thereof to a value greater than about 2.5 which causes iron contained in the solution to be hydrolyzed and precipitated. The precipitate is separated from the solution and the solution then subjected to an electrowinning process for the recovery of copper. A major drawback to this and other prior art processes is that substantial amounts of copper contained in the acid leach solution are hydrolyzed and precipitated along with iron contained therein, which copper is not recovered.

In order to overcome the loss of copper in the above-described process, the acid leach solution is often subjected to an electrowinning process for the recovery of copper prior to precipitating iron from the solution. However, this technique is also disadvantageous in that iron contained in the acid leach solution interferes with the electrowinning process making it relatively inefficient for copper recovery.

By the present invention an improved process for removing iron from aqueous acid solutions containing copper without removing the copper therefrom is provided. The use of the process of the present invention allows the efficient removal of iron from an acid leach solution and the subsequent efficient electrowinning of copper from the solution.

SUMMARY OF THE INVENTION

The improved process of the present invention for removing iron ions from an aqueous acid solution comprises the steps of combining activated carbon with the aqueous acid solution in an amount of at least about 0.01% by weight of said solution, adjusting the pH of the acid solution to a value in the range of from about 2.0 to about 2.5 so that iron ions contained in the solution are hydrolyzed and precipitated but copper ions contained therein remain in the solution and then separating the precipitate from the solution.

It is, therefore, a general object of the present invention to provide an improved process for selectively removing iron from an aqueous acid solution containing iron and copper.

A further object of the present invention is the provision of an improved process for recovering copper from acid leach solutions whereby iron contained in the solution is efficiently removed prior to recovering copper therefrom.

Yet a further object of the present invention is the provision of an improved process for electrowinning copper from an acid leach solution whereby iron contained in the solution is selectively removed prior to subjecting the solution to the electrowinning process.

Other and further objects, features and advantages of the invention will be readily apparent to those skilled in the art upon a reading of the description of preferred embodiments which follows.

DESCRIPTION OF PREFERRED EMBODIMENTS

As stated above, it is known in the art to remove iron from acid leach solutions by the precipitation of ferric ions as ferric hydroxide. That is, heretofore, calcium carbonate (generally in the form of particulated limestone) has been combined with acid leach solutions to cause iron contained therein to be hydrolyzed and precipitated. However, at an acid leach solution pH less than about 2.5, the hydrolysis reaction is too slow to be practical. At a pH above 2.5, the hydrolysis reaction takes place at a fast enough rate, but substantial amounts of copper contained in the aqueous acid leach solution are also hydrolyzed and precipitated. The precipitation of copper from the solution is disadvantageous where the recovery of copper from the acid leach solution is desired.

By the present invention, an improved process for the removal of iron from aqueous acid solutions containing both iron and copper is provided whereby the iron (ferric ions) are hydrolyzed and precipitated at a rate making the process practical without the precipitation of copper ions contained in the solution. The process of the invention basically comprises the steps of combining activated carbon with an aqueous acid solution containing ferric iron ions and copper ions in an amount of at least about 0.01% by weight of the solution, adjusting the pH of the acid solution to a value in the range of from about 2.0 to about 2.5 so that the iron ions contained in the solution are hydrolyzed and precipitated but copper ions contained therein remain in the solution and then separating the precipitate from the acid solution.

The addition of activated carbon to an aqueous acid solution containing ferric ions at a pH below 2.5 has been found to catalyze the hydrolysis reaction whereby iron hydroxide is precipitated from the solution at a relatively rapid rate without the hydrolysis of copper ions contained in the solution. The activated carbon catalyst is combined with the aqueous acid solution in an amount of at least about 0.01% by weight of the solution. At amounts below 0.01%, inadequate catalyzation of the hydrolysis reaction results. Amounts of catalyst greater than 0.01% by weight are effective and the upper limit is controlled by economic considerations. Preferably, the activated carbon catalyst is combined with the aqueous acid solution from which iron ions are to be precipitated in an amount in the range of from about 0.1% to about 2% by weight of the solution.

The process of the present invention is particularly well suited for removing ferric ions from aqueous sulfuric acid leach solutions used to extract copper values from ores. Such acid leach solutions are comprised predominantly of water, sulfuric acid, copper sulfate and iron sulfate. In accordance with this invention, activated carbon is combined with the sulfuric acid leach solution in an amount of at least about 0.01% by weight of the solution. The pH of the solution is then adjusted by adding a base thereto to a value in the range of from about 2 to about 2.5, preferably a pH of 2.2, so that iron ions contained in the solution are hydrolyzed and precipitated but copper ions remain in the solution. When the hydrolysis reaction and precipitation of iron hydroxide is completed, the precipitate is separated from the acid leach solution and the remaining solution is subjected to a process for the recovery of copper therefrom. Various electrolysis processes for the recovery of copper from acid solutions have been developed and used heretofore which can be efficiently carried out on the acid leach solution after a major portion of iron ions contained in the solution have been removed therefrom in accordance with the process of this invention.

Particularly suitable bases for adjusting the pH of aqueous sulfuric acid leach solutions are calcium carbonate, sodium carbonate or mixtures thereof. However, other bases which are compatible with sulfuric acid leach solutions and can be added thereto to adjust the pH without precipitating copper can be utilized.

In order to more clearly illustrate the invention, the following example is given.

EXAMPLE

An aqueous olution consisting of 1% by weight copper as copper sulfate, 1% by weight iron as ferric sulfate and 1% by weight sulfuric acid was prepared in the laboratory. Test portions of the solution were brought to a pH of 2.2 by the addition of calcium carbonate or sodium carbonate thereto. The test mixtures were stirred vigorously for one hour at the temperatures indicated in Table I below, after which they were filtered to remove precipitate therefrom, the precipitate washed and the combined filtrates diluted back to the original test volumes. The filtrates produced were each tested for iron and copper concentration, the results of such tests being given in the Table below.

TABLE I

COMPARISON OF IRON PRECIPITATION FROM AQUEOUS SULFURIC ACID TEST SOLUTIONS WITH AND WITHOUT ACTIVATED CARBON CATALYST

| BASE USED TO ADJUST pH | QUANTITY OF ACTIVATED CARBON ADDED TO TEST SOLUTION, WEIGHT % | TEMPERATURE OF TEST SOLUTION, °C | IRON REMOVED FROM TEST SOLUTION IN PRECIPITATE, WEIGHT % | COPPER REMOVED FROM SOLUTION IN PRECIPITATE, WEIGHT % |
|---|---|---|---|---|
| $CaCO_3$ | 0 | 80 | 24 | 0 |
| $CaCO_3$ | 1 | 80 | 47 | 0 |
| $Na_2CO_3$ | 0 | 80 | 25 | 0 |
| $Na_2CO_3$ | 1 | 80 | 33 | 0 |
| $CaCO_3$ | 0 | 25 | 4 | 0 |
| $CaCO_3$ | 1 | 25 | 20 | 0 |
| $Na_2CO_3$ | 0 | 25 | 0 | 0 |
| $Na_2CO_3$ | 1 | 25 | 14 | 0 |

From the Table, it can clearly be seen that the presence of activated carbon catalyst in the aqueous sulfuric acid test solutions resulted in the precipitation of increased quantities of iron hydroxide with no precipitation of copper as compared to the precipitation of iron hydroxide without the catalyst.

The present invention, therefore, is well adapted to carry out the objects and attain the ends and advantages mentioned as well as those inherent therein. While presently preferred embodiments of the invention have been given for the purposes of this disclosure, numerous changes in the process of the invention can be made by those skilled in the art. For example, the activated carbon catalyst of the invention can be added to the aqueous acid solution before or after adjusting the pH thereof to the desired range.

What is claimed is:

1. A process for removing iron ions from an aqueous acid solution without removing copper ions contained therein comprising the steps of:
   combining activated carbon with said aqueous acid solution in an amount of at least about 0.01% by weight of said solution;
   adjusting the pH of said acid solution to a value in the range of from about 2.0 to about 2.5 so that iron ions contained in said solution are hydrolyzed and precipitated but copper ions contained therein remain in said solution; and
   then separating the precipitate from said acid solution.

2. The process of claim 1 wherein said activated carbon is combined with said acid solution in an amount in the range of from about 0.1 to about 2% by weight of said solution.

3. The process of claim 2 wherein the pH of said solution is adjusted by combining a base therewith selected from the group consisting of calcium carbonate, sodium carbonate and mixtures thereof.

4. A process of removing ferric ions from an aqueous sulfuric acid leach solution containing copper ions without removing the copper ions therefrom which comprises the steps of:
   combining activated carbon with said aqueous acid leach solution in an amount of at least about 0.01% by weight of said solution;

combining a base with said aqueous acid leach solution to adjust the pH thereof to a value in the range of from about 2.0 to about 2.5 so that said ferric ions are hydrolyzed and precipitated but copper ions contained in said solution remain therein; and separating the precipitate from said solution.

5. The process of claim 4 wherein said activated carbon is combined with said sulfuric acid leach solution in an amount in the range of from about 0.1 to about 2% by weight of said solution.

6. The process of claim 5 wherein said base is calcium carbonate.

7. In a process for recovering copper from an aqueous sulfuric acid leach solution containing copper and iron sulfates wherein iron is removed from said solution by combining a base therewith in an amount which adjusts the pH of said solution to a value greater than 2.5 thereby causing said iron and a portion of said copper to be hydrolyzed and precipitated, separating the resulting precipitate from said solution and then subjecting said solution to an electrowinning process to recover copper values therefrom, the improvement which comprises:

adjusting the pH of said solution to a value in the range of from about 2 to about 2.5 so that iron ions contained in said solution are hydrolyzed and precipitated but copper ions remain in said solution; and combining activated carbon with said solution in an amount of at least about 0.1% by weight of said solution so that the rate of hydrolysis of said iron ions is increased.

8. The process of claim 7 wherein said activated carbon is combined with said solution in an amount in the range of from about 0.1 to about 2% by weight of solution.

9. The process of claim 8 wherein said base is calcium carbonate.

* * * * *